H. F. ZIEMAN, DEC'D.
B. ZIEMAN, ADMINISTRATRIX.
WATERING AND SPRAYING APPARATUS.
APPLICATION FILED OCT. 8, 1910.
985,316.
Patented Feb. 28, 1911.
2 SHEETS—SHEET 1.
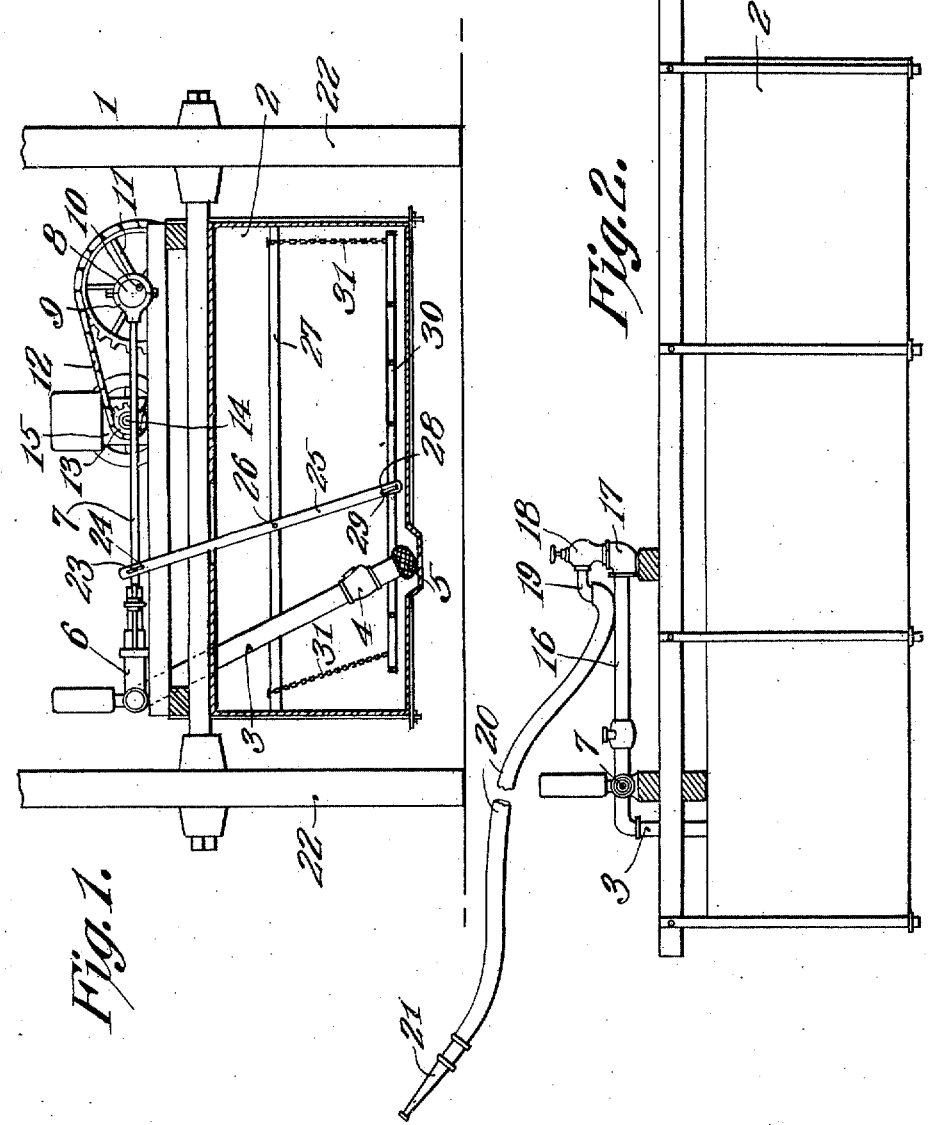

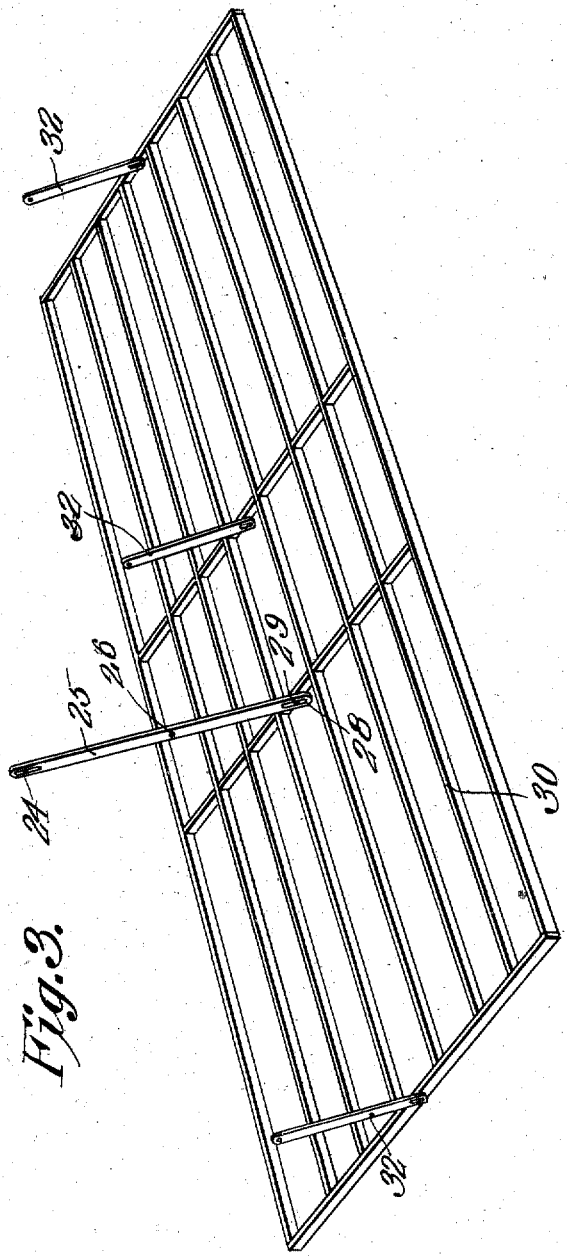

UNITED STATES PATENT OFFICE.

HERMAN F. ZIEMAN, DECEASED, LATE OF GRAND JUNCTION, COLORADO; BERTHA ZIEMAN, ADMINISTRATRIX.

WATERING AND SPRAYING APPARATUS.

985,316. Specification of Letters Patent. Patented Feb. 28, 1911.

Application filed October 8, 1910. Serial No. 586,118.

*To all whom it may concern:*

Be it known that HERMAN F. ZIEMAN, deceased, late a citizen of the United States, residing at Grand Junction, in the county of Mesa and State of Colorado, did invent a new and useful Watering and Spraying Apparatus, of which the following is a specification.

This invention belongs to a watering and spraying apparatus having a tank, and a motor driven pump for elevating the water from the tank, in conjunction with a new and useful agitator arranged in the tank for agitating the contents thereof; said agitator being operated by the reciprocating rod of the pump.

The essential object of the invention is to provide an agitator comprising novel features of construction. The drawings, however, only disclose one form of the invention, but in practical fields this form may necessitate slight alterations, to which the applicant is entitled, provided the alterations are comprehended by the claims.

Other objects and combinations of features will be hereinafter set forth, shown in the drawings, and claimed.

In the drawings, Figure 1 is an elevation of the apparatus, partly in section, disclosing clearly the agitating member. Fig. 2 is an elevation of the apparatus at right angles to that shown in Fig. 1. Fig. 3 is an enlarged detail perspective view of the agitating member.

In regard to the drawings, 1 represents the framework of the apparatus, from which the tank 2 is suspended. The tank is designed to contain water or any other suitable fluid. If it contains a fluid other than water, for instance, a combination of chemicals, the apparatus may be used for extinguishing fire, it being understood, however, that the water also can be used for this purpose.

Extending into the tank is a pipe 3 having a check valve 4, the detail structure of which is not shown, and provided with a strainer 5 at its extreme lower end. This pipe 3 connects with the pump 6, the rod 7 of which is reciprocated by the eccentric 8, about which the eccentric strap 9 of the rod encircles. The eccentric 8 is carried by and rotatable with the shaft 10. Also mounted upon and movable with the shaft 10 is the sprocket 11 about which the chain 12 travels. This chain also travels over the sprocket 13, which is mounted upon and rotatable with the shaft 14. This shaft 14 is operated by any suitable form of gasolene motor 15, the detail structure of which forms no part of the present invention. The pump 6 may be of any desired construction, and leading from it is a pipe 16, which is threaded into an elbow 17. Threaded into the elbow is the usual form of valve 18, the purpose of which being to regulate the out-flow of the fluid from the tank; that is to say, when the pump is in operation. The detail structure of this valve 18 is not shown, for the reason that it forms no part of the invention. Leading from the casing of the valve 18 is a short pipe 19, to which the hose 20 is connected. The hose 20 is provided with the usual form of nozzle 21. It will be observed that when the pump is in full operation, the water or fluid in the tank is elevated and forced through the hose, in order to extinguish fires. When there is water in the tank, this apparatus may be utilized for watering gardens and lawns, for the simple reason that the framework and tank are supported upon wheels 22, so that the same may be moved from one place to another.

The pump rod 7 has projecting from it a stud 23, which extends through a slot 24 of the oscillating lever 25. This oscillating lever 25 is fulcrumed, as at 26, to a bar 27 which extends transversely of the tank. The lower end of the lever 25 is also provided with a slot 28, into which the pin 29 extends. This pin 29 projects laterally from one of the bars of the agitator 30. The agitator 30 is suspended from the bar 27 by means of the ropes 31. In Fig. 3, however, it will be seen that the agitator is provided with additional suspending means, such as the links 32, which, in Fig. 1, appear in alinement with the oscillating bar 25.

As the pump rod 7 reciprocates, an oscillating motion is imparted to the bar 25, and by virtue of the lower end of this bar 25 being connected to the agitator, a rocking backward and forward movement is imparted to the agitator.

It will be observed that when the solution is elevated through the pipe 3, all foreign matter is separated from it, by means of the strainer 5.

The invention having been set forth, what is claimed as new and useful is:

1. In a device as set forth, a fluid containing tank having a transversely arranged bar therein, chains extending from the bar, an agitator having connections with the lower ends of such chains, an oscillating member fulcrumed to the bar and pivoted at its lower end to the agitator, and a mechanism having a member pivoted to the upper end of said oscillating member, whereby a reciprocating motion may be imparted to the agitator.

2. In a device as set forth, a fluid containing tank, a motor driven pump connected therewith, said tank having a transversely arranged bar, chains hanging from said bar, a skeleton agitating frame located in the tank and connected to the lower ends of the chains, an oscillating member fulcrumed to the bar having its lower end provided with a slot and pin connection with the agitator, and having its upper end provided with a slot and pin connection with the rod of the pump.

In testimony that I claim the foregoing as the invention of the said HERMAN F. ZIEMAN, I have hereto affixed my signature in the presence of two witnesses.

BERTHA ZIEMAN,
*Administratrix of the estate of Herman F. Zieman.*

Witnesses:
HARRY L. HIATT,
FRED. H. FOHRMEYER.

---

Copies of this patent may be obtained for five cents each, by addressing the "Commissioner of Patents, Washington, D. C."